United States Patent
Alexander

(10) Patent No.: US 10,105,006 B2
(45) Date of Patent: Oct. 23, 2018

(54) COOKING APPLIANCE WITH INDICATORS FORMED USING ELECTROCHROMIC MATERIAL

(71) Applicant: Electrolux Home Products, Inc., Charlotte, NC (US)

(72) Inventor: Michael Alexander, Hermitage, TN (US)

(73) Assignee: Electrolux Home Products, Inc., Charlotte, NC (US)

(*) Notice: Subject to any disclaimer, the term of this patent is extended or adjusted under 35 U.S.C. 154(b) by 121 days.

(21) Appl. No.: 15/093,674

(22) Filed: Apr. 7, 2016

(65) Prior Publication Data

US 2017/0290463 A1 Oct. 12, 2017

(51) Int. Cl.
*G02F 1/15* (2006.01)
*A47J 37/06* (2006.01)
*F24C 3/12* (2006.01)
*F24C 15/04* (2006.01)

(52) U.S. Cl.
CPC .......... *A47J 37/0664* (2013.01); *F24C 3/124* (2013.01); *F24C 15/04* (2013.01)

(58) Field of Classification Search
CPC . G02B 26/02; G02F 1/15; G02F 1/155; G02F 1/163; G02F 2001/1552; G02F 2201/44; F24C 7/06; F24C 7/08; F24C 7/086; F24C 3/124; F24C 3/126; F24C 15/04; H05B 6/065; H05B 6/12; A47J 37/01; A47J 37/0664; A47J 36/027

USPC .................................................. 359/265–275
See application file for complete search history.

(56) References Cited

U.S. PATENT DOCUMENTS

| | | | |
|---|---|---|---|
| 4,660,939 A | 4/1987 | Tsuchiya et al. | |
| 5,589,958 A * | 12/1996 | Lieb ........................ | A47F 3/007 312/114 |
| 5,962,148 A | 10/1999 | Nishimura et al. | |
| 6,569,361 B1 | 5/2003 | Bemeth et al. | |
| 6,631,023 B1 | 10/2003 | Bemeth et al. | |
| 2003/0227664 A1 * | 12/2003 | Agrawal ............... | G02F 1/1523 359/269 |

* cited by examiner

*Primary Examiner* — Mustak Choudhury
(74) *Attorney, Agent, or Firm* — Pearne & Gordon LLP

(57) ABSTRACT

Provided is a cooking appliance that includes an oven cavity and an oven door is pivotally coupled adjacent to an entrance leading into the oven cavity, and a method of controlling such a cooking appliance. The oven door includes a substantially opaque region that interferes with external observation of the oven cavity while the door is in the closed orientation, and an electrochromic indicator provided to the opaque region. The electrochromic indicator includes a material with a first appearance that renders the electrochromic indicator substantially indistinguishable from the opaque region in a first operational state, and a second appearance in a second operational state that contrasts with the opaque region to issue a notification related to operation of the cooking appliance.

14 Claims, 2 Drawing Sheets

COOKING APPLIANCE WITH INDICATORS FORMED USING ELECTROCHROMIC MATERIAL

BACKGROUND OF THE INVENTION

1. Field of the Invention

This application relates generally to a method and apparatus for indicating an operational status of a cooking appliance and, more particularly, to a cooking appliance and corresponding method utilizing an indicator formed from an electrochromic material provided to a surface of the appliance to indicate an operational state.

2. Description of Related Art

Oven ranges typically include an oven cavity and an oven door that restricts access into the oven cavity. To ensure sufficient access to the interior of the oven cavity and allow large food items such as turkeys, cakes, etc. to be placed therein, the oven door is typically a large, planar structure that extends over most of the appliance's height. Efforts to maximize the volume of the oven cavity for cooking have only further increased the size of the oven door. Although many oven doors include a transparent window that allows food being cooked to be observed without opening the oven door, most of the remaining externally-exposed surface of the oven door serves no function other than to provide the closed oven cavity with a pleasing aesthetic appearance.

Due to the space required for the oven cavity/oven door, cooktops, and other functional features that are operable to emit heat and cook food, there is a limited amount of space remaining for other features. User interfaces for displaying relevant information, for example, and other such features that do not directly heat food must be small enough to fit on the remaining cabinet space not utilized by the cooking features. As a result, the amount of information that can be displayed and the size of the displayed information has traditionally been small.

BRIEF SUMMARY OF THE INVENTION

According to one aspect, the subject application involves a cooking appliance that includes an oven cavity in which a food item is to be exposed to an elevated temperature established by a heating element to be cooked. An oven door is pivotally coupled adjacent to an entrance leading into the oven cavity to be adjusted between an open orientation and a closed orientation to selectively grant entry to the oven cavity. The oven door also includes a substantially opaque region that interferes with external observation of the oven cavity while the door is in the closed orientation. An electrochromic indicator is provided to the opaque region of the oven door. The electrochromic indicator includes a material with a first appearance that renders the electrochromic indicator substantially indistinguishable from the opaque region in a first operational state and a second appearance in a second operational state that contrasts with the opaque region to issue a notification related to operation of the cooking appliance.

According to another aspect, the subject application involves a method of providing a notification related to operation of a cooking appliance including an oven cavity and an oven door restricting access to the oven cavity. The method includes receiving an instruction entered via a control panel provided to the cooking appliance to establish a desired operational state of the cooking appliance involving the oven cavity. A voltage is established across a material of an electrochromic indicator provided to an opaque region of the oven door to transition an appearance of the material from a first appearance resembling an opaque portion of the oven door to a second appearance that contrasts with the opaque region to issue a notification related to the desired operational state of the cooking appliance.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 1:
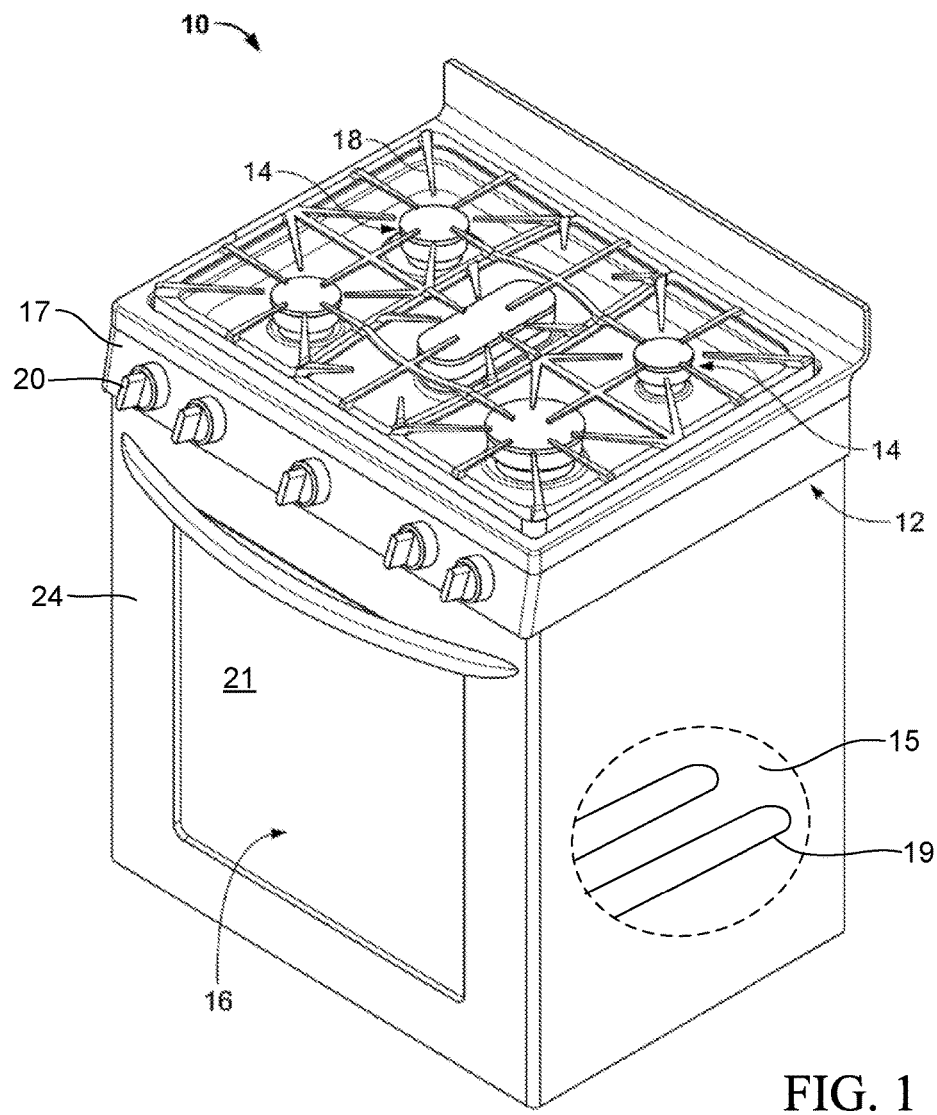
FIG. 1 is a perspective view of an oven range in accordance with an illustrative embodiment.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

An illustrative embodiment of a cooking appliance 10 is shown in FIG. 1. As shown, the cooking appliance 10 is an oven range that includes a cabinet 12 supporting a cooktop surface comprising a plurality of surface burners 14. A grate 18 is provided to support a pot, pan or other cooking vessel at an elevation vertically above the burners 14 so food in the cooking vessel can be heated by the burners 14. Although the cooking appliance 10 in FIG. 1 includes a gas cooktop with burners 14 that combust a gas to generate flames for heating food in cooking vessels, alternate embodiments of the cooking appliance 10 can instead include an electric cooktop with a plurality of resistive heating elements that, when energized with electric energy from a power source such as an AC mains outlet supplied by an electric utility, emit heat. Such resistive heating elements can be exposed at the cooktop surface to support the cooking vessels or disposed beneath a glass-ceramic surface that supports the cooking vessels vertically above such burners. According to yet other embodiments, the cooking appliance 10 can include an inductive cooktop instead of a gas or electric cooktop. For such embodiments, inductive elements arranged beneath a glass-ceramic cooktop surface conduct an alternating electric current to generate an oscillating magnetic field which, in turn, induces eddy currents in ferrous cooking vessels to generate heat. Yet other embodiments of the cooking appliance 10 can lack a cooktop altogether, including only an oven cavity 15 described in detail below.

The cooking appliance 10 in FIG. 1 also includes an oven cavity 15 (the interior of which is shown in the cutaway section of the cabinet 12) in which a food item is to be exposed to an elevated temperature established by one or more heating elements 19 in order to be cooked. Similar to the cooktop described above, the oven cavity 15 can optionally be heated by energizing the heating element(s) 19 using any desired fuel. For the example shown in FIG. 1, the heating element 19 includes a serpentine tube through which a combustible gas (e.g., natural gas, propane, etc.) supplied by a residential gas line, for example, travels and is emitted through an array of small holes formed in the walls of the tube. The emitted gas is combusted to generate the heat that elevates the temperature within the oven cavity 15. However, alternate embodiments of the heating element 19 can again be energized by electricity from an AC mains outlet supplied by an electric utility. The resistance of the heating element 19 results in the generation of heat to elevate the temperature within the oven cavity 15. The heating element 19 can be any type of heat emitting device in thermal communication with the oven cavity 15 to provide a heating effect to the oven cavity 15, and thereby elevate the temperature therein to a desired cooking temperature. Regardless of the type of heating element 19, the heating element 19 can include a bake element arranged adjacent to the bottom of the oven cavity 15, a broil element arranged adjacent to the ceiling of the oven cavity 15, or a combination thereof.

A control panel 17 is provided with a plurality of control knobs 20 or other input devices (e.g., tactile push buttons, a touch-sensitive computer display device, capacitive touch sensors, etc.), or a combination of different input devices, to allow a user to control operation of the cooktop burners 14 and/or heating element(s) 19. Via the control panel 17, users can initiate one or more of a plurality of different operational states available for that cooking appliance 10, including at least one of: pyrolytic oven cleaning, baking, broiling, preheating, keeping food warm following completion of a cooking operation, and any other operational state involving the oven cavity 15.

An oven door 16 is pivotally coupled by one or more hinges adjacent to an entrance through which food is inserted into, and removed from the oven cavity 15. The oven door 16 is adjustable between an open orientation and a closed orientation (closed orientation shown in FIG. 1) to selectively grant entry to the oven cavity 15 and enclose the oven chamber from the ambient environment of the cooking appliance 10, respectively. The oven door 16 in FIG. 1 includes a window 21 that allows for external observation of the oven cavity 15 (e.g., the interior of the oven cavity 15 can be viewed through the window 21 from a vantage point of a user standing in front of the cooking appliance 10) while the oven door 16 is in the closed orientation. Surrounding the window 21 is a frame 24 region that couples the window 21 to the oven door 16 and forms an opaque region that interferes with external observation of the oven cavity while the door is in the closed orientation. In other words, the window 21 is substantially transparent, allowing food within the oven cavity 15 to be viewed from a vantage point in front of the cooking appliance 10. Being opaque, the frame 24 does not allow light to pass there through, and blocks the view of the oven cavity 15 (and any food therein) from the vantage point in front of the cooking appliance 10. For example, embodiments of the frame 24 can be made of a stainless steel, brushed aluminum, or other metallic material that can be a conductor of electricity having a conductivity of at least $1 \times 10^6$ S/m at 20° C. For such embodiments, the material forming the frame 24 can be utilized as an electrode to electrically connect material forming an electrochromic indicator 27 (FIGS. 2 and 3) to an energy source 34 (FIG. 4) (e.g., electric power supply) and/or a reference voltage (e.g., ground) as described in detail below. However, according to alternate embodiments, the externally-exposed surface of the frame 24 can be formed from a plastic material insulated from the elevated temperatures within the oven cavity 15 by an insulating material disposed between the plastic material and the oven cavity 15.

Figure 2:
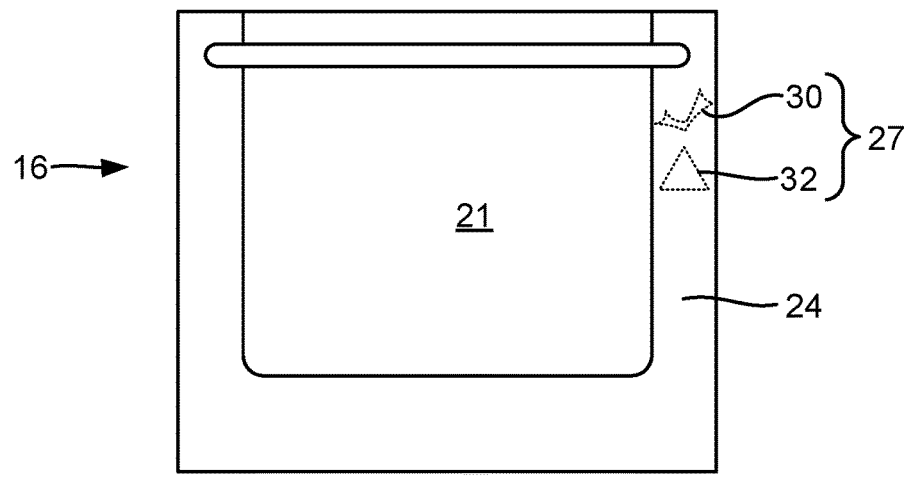
FIG. 2 is a front view of an illustrative embodiment of an oven door with a plurality of electrochromic indicators provided to an opaque region, the electrochromic indicators being in their native operational state in the absence of an applied voltage.
Figure 3:
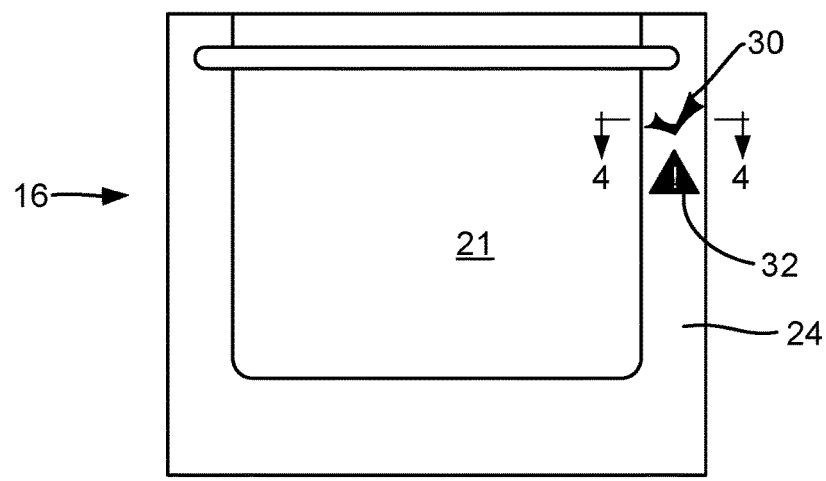
FIG. 3 is a front view of the illustrative embodiment of the oven door appearing in FIG. 2, but with the plurality of electrochromic indicators shown in their driven operational state in the presence of a voltage applied across each electrochromic indicator.

As illustrated in FIGS. 2 and 3, an electrochromic indicator 27, or optionally a plurality of electrochromic indicators 27 can be provided to an outwardly-exposed surface the opaque frame 24 of the oven door 16. Each electrochromic indicator 27 includes a material 29 (FIG. 4) that is coated onto or otherwise applied (e.g., screen printed, etc.) to the outwardly-exposed surface of the oven door 16 to form a desired shape and/or pattern. For example, the electrochromic indicators 27 shown in FIGS. 2 and 3 include a checkmark 30 arranged above a warning triangle 32 with an exclamation point "!" therein. Each electrochromic indicator 27 has a fixed shape and/or pattern, so every time a particular electrochromic indicator 27 is energized or otherwise rendered active, that electrochromic indicator 27 will have the same appearance. In other words, the electrochromic indicators 27 can be toggled between on and off, or active and inactive states to uniquely signal that a predetermined operational state of the cooking appliance 10 involving the oven cavity 15 is active, as opposed to computer displays and seven-segment displays, for example, which are dynamic and take on different appearances to display a variety of different information. According to alternate embodiments, although the electrochromic indicators 27 can include a fixed shape, such electrochromic indicators 27 can be activated to signal the occurrence of different events and/or conditions. For example, the checkmark 30 can be illuminated to signal the expiration of a timer while the cooking appliance 10 is operational in a first mode. Thus, activation of the checkmark 30 can notify an observer that a timed baking cycle is complete. However, the checkmark 30 could also be illuminated to signal the occurrence of a different event, such as a preheat temperature specified by the user being reached within the oven cavity 15.

In the illustrative embodiment shown in FIGS. 2 and 3, the electrochromic indicators 27 include a check mark 30 and a warning triangle 32 that each, when active, indicates a different operational state. For example, the check mark 30 can be activated and displayed to indicate expiration of a timer, and the warning triangle 32 can be activated and displayed to indicate when the oven is undergoing pyrolytic cleaning (e.g., the oven temperature is raised to a temperature of at least 700° F.). Such electrochromic indicators 27 can optionally have a dimension extending in a direction of the oven door's height of at least one inch, or at least two inches, and a dimension extending in a transverse direction across a width of the oven door 16 of at least one inch, or at least two inches. Regardless of the specific dimensions, the electrochromic indicators 27 are visible, comprehensible and distinguishable from each other at a distance of at least ten (10 ft.) feet from the cooking appliance 10, or at least fifteen (15 ft.) feet from the cooking appliance 10, when the electrochromic indicators 27 are active.

Figure 4:
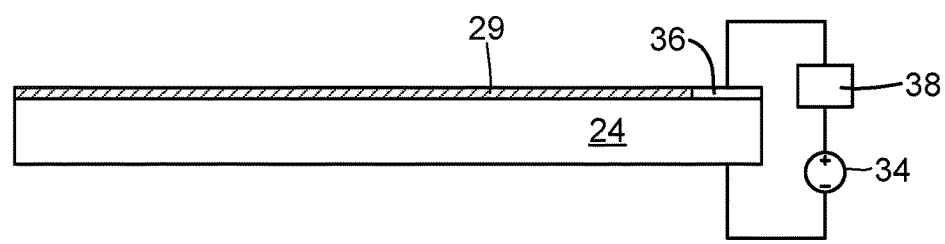
FIG. 4 is a sectional view of a region of the oven door appearing in FIGS. 2 and 3 provided with a coating material forming a portion of an electrochromic indicator, and a control that controls delivery of electric energy from a power supply to the electrochromic indicator.

With reference to FIG. 4, the electrochromic indicator 27 includes an electrochromic material 29 (FIG. 4) applied to an externally-exposed surface of the frame 24. This material can change color (e.g., from one color to another color), state (e.g., from transparent to a colored, translucent or opaque state), or otherwise be adjustable from a state in which it is not readily distinguishable from the frame material 24 on which it is applied to a state in which it is visible and distinguishable from the frame material 24 in response to application or removal of a voltage across the material 29 by a source 34. Thus, in an inactive state, the electrochromic indicators 27 blend in with the frame material 24, causing the frame material 24 to appear as if it is devoid of the electrochromic indicator 27 when viewed from a distance. In an active sate, however, the electrochromic indicators 27 contrast with, and stand out from the frame material 24 to be visible and distinguishable from the background. Examples of suitable materials that exhibit electrochromic properties include, but are not limited to: tungsten oxide ($WO_3$), nickel oxide (NiO), polyaniline, and other substances that exhibit an adjustable appearance as described herein.

For example, the native color of the electrochromic material 29 in the absence of an applied voltage can substantially match the color of the externally-exposed surface of the frame material 24. When the voltage is applied across the electrochromic material 29, the color of the electrochromic material 29 transitions from its native color to a second color that contrasts with the color of the externally-exposed surface of the frame material 24. When the voltage is subsequently removed, the electrochromic material 29 returns to its native color.

According to an alternate embodiment, the electrochromic material 29 can be substantially transparent in a native state in the absence of an applied voltage. In this state, the externally-exposed surface of the frame material 24 is visible through the transparent electrochromic material 29. Upon the occurrence of a predetermined event involving the oven cavity 15 or cooking appliance 10, the voltage can be applied across the electrochromic material 29 to cause the electrochromic material 29 to transition to a substantially opaque state.

In the foregoing description, the electrochromic indicators 27 are described as being "not readily" distinguishable from the frame material 24, "substantially" matching the color of the frame material 24, and "substantially" transparent in their inactive state. Such terms of degree do not necessarily require the electrochromic indicators 27 to be absolutely invisible in their inactive state, but only that they do not stand out from the frame material 24 to the same extent as when the electrochromic indicators 27 are active. In other words, a careful observer specifically looking for the electrochromic indicators 27 in their inactive state may be able to discern their location upon close inspection of the oven door 16. However, the inactive electrochromic indicators 27 in their inactive state are not visible to a casual observer of the cooking appliance 10 who is not specifically looking for the electrochromic indicators, but is only viewing the cooking appliance 10 in passing, and from a distance.

Referring again to FIG. 4, the source 34 is operatively connected to the electrochromic material 29 by a first electrode 36 that conducts electric energy from the source 34 to apply the voltage across the electrochromic material 29. For embodiments where the door material 24 forming the opaque region of the oven door 16 is an electrically-conductive material, this door material 24 can form a second electrode electrically connecting the electrochromic material 29 to a reference voltage such as a ground potential, for example.

A controller 38 includes a suitably-programmed microprocessor or other control circuitry to control switching devices for applying and removing the voltage supplied by the source 34 to control activation and deactivation of the electrochromic indicators 27. The controller is configured to activate one or more of the electrochromic indicators 27 in response to determining that a specific event has occurred. For example, the controller 38 can be operatively connected to receive communications from the control panel 17 indicative of user-entered commands and instructions governing operation of the heating element(s) 19 and optionally one or more of the cooktop burners 14. The controller 38 can reference a lookup table or other data source stored in a computer-readable memory provided to the controller 38 to determine a triggering event corresponding to the operational state of the cooking appliance 10 that is to be signaled through activation of one or more of the electrochromic indicators 27.

For example, the controller 38 can be configured to activate the electrochromic indicator 30 in response to a determination that at least one of the following has occurred: a pyrolytic oven cleaning cycle has been completed, a baking cycle has been activated by the user via the control panel 17, a preheat temperature specified by the user via the control panel 17 has been reached within the oven cavity 15, a broiling cycle has been activated by the user via the control panel 17, a timer has expired to mark the end of a cooking operation (e.g., baking, broiling, cooktop heating, etc.), the heating element(s) 19 are operating to keep food warm following completion of a cooking operation involving the oven cavity 15, and any other completed event involving the cooking appliance. Likewise, the electrochromic indicator 32 can be activated to indicate that an unexpected and/or undesirable event involving the cooking appliance 10 has occurred, or any other event involving the oven cavity 15 and/or cooktop.

Embodiments of the electrochromic indicators 27 may be formed from a material that requires an extended period of time for its appearance to transition from the inactive state to the active state. For example, that change of appearance that results from transitioning from the inactive to the active state can take longer than one (1 sec.) second, and optionally longer than two (2 sec.) seconds to complete. Depending on the electrochromic material 29 utilized, this transition can take longer than five (5 sec.) seconds to fully complete. In view of time constraints of transitioning the electrochromic material 29 from an inactive state to an active state, embodiments of the controller 38 can be configured to update the state of the electrochromic indicator 27 to provide a visible indication of conditions that are scheduled to be updated no more than once in a one (1 min.) minute period, or optionally no more than once in a two (2 min.) minute period.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention.

What is claimed is:

1. A cooking appliance comprising:
an electrochromic indicator provided to an outer surface of the appliance, the electrochromic indicator comprising a material with a first appearance that renders the electrochromic indicator substantially indistinguishable from the surface on which it is provided in a first operational state and a second appearance in a second operational state that contrasts with said surface so as to be visible and distinguishable from a background of said surface, and issues a notification related to operation of the appliance,
wherein the notification provides a visible indication of a condition of the cooking appliance that is scheduled to be updated no more than once in a one minute period.

2. The cooking appliance of claim 1, wherein the material changes color as part of a transition from the first appearance to the second appearance in response to application of a voltage across the material.

3. The cooking appliance of claim 2 further comprising a first electrode electrically connecting the material to a power source for establishing the voltage across the material.

4. The cooking appliance of claim 3, said appliance comprising an oven with an oven door, wherein a door material forming an opaque region of the oven door is an electrically-conductive material that forms a second electrode electrically connecting the material to a reference voltage that is a ground potential.

5. The cooking appliance of claim 1, wherein the material is a coating applied in a desired pattern to an exposed surface of the oven door.

6. The cooking appliance of claim 5, wherein the desired pattern establishes a fixed shape of the visible indicator that uniquely identifies a mode of operation of the cooking appliance in the second operational state.

7. The cooking appliance of claim 1, wherein the first appearance comprises a color that is a native color of the material absent application of the voltage.

8. The cooking appliance of claim 1, the cooking appliance comprising an oven with an oven cavity, wherein the electrochromic indicator in the second operational state provides a visible indication of an operational cooking mode of the oven cavity.

9. The cooking appliance of claim 1, further comprising a cooktop comprising a plurality of individually-controllable burners.

10. The cooking appliance of claim 1, wherein the electrochromic indicator has a height and/or width dimension that is at least two inches.

11. A method of providing a notification related to operation of a cooking appliance comprising an oven cavity and an oven door restricting access to the oven cavity, the method comprising:
receiving an instruction entered via a control panel to establish a desired operational state of the cooking appliance involving the oven cavity; and
establishing a voltage across a material of an electrochromic indicator provided to an opaque region of the oven door to transition the material from a first appearance resembling an opaque portion of the oven door to a second appearance that contrasts with the opaque region so as to be visible and distinguishable from a background of said opaque region, and issues a notification related to the desired operational state of the cooking appliance,
wherein the notification provides a visible indication of a condition of the cooking appliance that is scheduled to be updated no more than once in a one minute period.

12. The method of claim 11, wherein said establishing the voltage comprises closing an electric circuit to:
electrically connect the material to a power source using a first electrode; and
electrically connect the material to a reference voltage using a door material forming the opaque region of the oven door.

13. The method of claim 11, wherein said establishing the voltage causes the material to undergo a transition from a native color resembling the opaque region absent application of any applied voltage to the second color made visible in response to application of the voltage.

14. A cooking appliance comprising:
an oven cavity;
an oven door;
a frame of the oven door that forms an opaque region of an electrically-conductive material that interferes with external observation of the oven cavity while the door is closed;
an electrochromic indicator provided to an outer surface of the frame, the electrochromic indicator comprising a material with a first appearance that renders the electrochromic indicator substantially indistinguishable from the surface on which it is provided in a first operational state and a second appearance in a second operational state that contrasts with said surface so as to be visible and distinguishable from a background of said surface, and issues a notification related to operation of the appliance;
a first electrode electrically connecting the material to a power source for establishing the voltage across the material; and
a second electrode electrically connecting the material to a reference voltage,
wherein the reference voltage is a ground potential.

* * * * *